United States Patent
Leone et al.

(10) Patent No.: US 10,272,741 B2
(45) Date of Patent: Apr. 30, 2019

(54) METHODS AND SYSTEM FOR HEATING A HYBRID VEHICLE

(71) Applicant: Ford Global Technologies, LLC, Dearborn, MI (US)

(72) Inventors: Thomas G. Leone, Ypsilanti, MI (US); Kenneth James Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 679 days.

(21) Appl. No.: 14/540,966

(22) Filed: Nov. 13, 2014

(65) Prior Publication Data

US 2016/0137030 A1    May 19, 2016

(51) Int. Cl.
| | |
|---|---|
| *B60H 1/00* | (2006.01) |
| *B60H 1/04* | (2006.01) |
| *F01P 7/16* | (2006.01) |
| *F02D 41/00* | (2006.01) |
| *F01P 3/02* | (2006.01) |

(52) U.S. Cl.
CPC ......... *B60H 1/00885* (2013.01); *B60H 1/004* (2013.01); *B60H 1/00314* (2013.01); *B60H 1/04* (2013.01); *F01P 7/165* (2013.01); *F02D 41/0082* (2013.01); *F01P 2003/021* (2013.01); *F01P 2060/08* (2013.01); *F02D 2200/021* (2013.01)

(58) Field of Classification Search
CPC .................. B60H 1/00314; F01P 2003/02
See application file for complete search history.

(56) References Cited

U.S. PATENT DOCUMENTS

| | | | | | |
|---|---|---|---|---|---|
| 4,616,601 | A | * | 10/1986 | Hayashi | F01P 11/18 123/41.21 |
| 5,979,394 | A | * | 11/1999 | Schmidt | F02D 13/04 123/198 F |
| 6,786,191 | B2 | * | 9/2004 | Foster | B60H 1/00314 123/198 F |
| 6,904,752 | B2 | * | 6/2005 | Foster | B60H 1/00314 60/285 |
| 7,236,875 | B2 | * | 6/2007 | Bevan | B60H 1/00314 701/113 |

(Continued)

FOREIGN PATENT DOCUMENTS

| | | |
|---|---|---|
| CN | 1715620 A | 1/2006 |
| CN | 1934573 A | 3/2007 |

OTHER PUBLICATIONS

State Intellectual Property Office of the People's Republic of China, Office Action and Search Report Issued in Application No. 201510778202.3, Dec. 24, 2018, 10 pages. (Submitted with Partial Translation).

*Primary Examiner* — Avinash A Savani
*Assistant Examiner* — Deepak A Deean
(74) *Attorney, Agent, or Firm* — David Kelley; McCoy Russell LLP

(57) ABSTRACT

Systems and methods for providing heat to a passenger cabin of a hybrid vehicle that includes an internal combustion engine are presented. The systems and methods may selectively operate the internal combustion engine with one or more engine cylinders deactivated and may selectively flow coolant to one or more cylinders to improve passenger cabin heating in response to a request for passenger cabin heat.

8 Claims, 5 Drawing Sheets

(56) References Cited

U.S. PATENT DOCUMENTS

| | | | | |
|---|---|---|---|---|
| 8,215,283 B2* | 7/2012 | Warchuck | ............... | F01P 3/02 |
| | | | | 123/198 F |
| 2003/0101961 A1* | 6/2003 | Foster | ............... | B60H 1/00314 |
| | | | | 123/198 F |
| 2003/0121249 A1* | 7/2003 | Foster | ............... | B60H 1/00314 |
| | | | | 60/285 |
| 2003/0131820 A1* | 7/2003 | Mckay | ............... | F01L 13/0005 |
| | | | | 123/198 F |
| 2007/0227791 A1* | 10/2007 | Ueno | ............... | B60K 6/387 |
| | | | | 180/65.245 |
| 2009/0293521 A1 | 12/2009 | Major et al. | | |
| 2010/0251977 A1 | 10/2010 | Warchuck | | |
| 2013/0197749 A1* | 8/2013 | Martini | ............... | F02D 41/021 |
| | | | | 701/36 |
| 2013/0255604 A1* | 10/2013 | Rollinger | ............... | F01P 7/048 |
| | | | | 123/41.15 |
| 2013/0333641 A1* | 12/2013 | Araki | ............... | F01P 9/02 |
| | | | | 123/41.02 |
| 2014/0171260 A1 | 6/2014 | Dalum | | |
| 2014/0360477 A1* | 12/2014 | Doering | ............... | F02D 41/144 |
| | | | | 123/673 |

\* cited by examiner

METHODS AND SYSTEM FOR HEATING A HYBRID VEHICLE

FIELD

The present description relates to methods and a system for heating a passenger cabin of a hybrid vehicle. The methods and systems may be particularly useful for hybrid vehicles that include multiple cylinder engines.

BACKGROUND AND SUMMARY

A hybrid vehicle may include an internal combustion engine and an electric motor to propel the vehicle. The motor may propel the vehicle at lower driver demand torque levels, and the engine may operate to provide higher driver demand torques. The engine may also be activated at lower ambient temperatures to heat the vehicle's passenger cabin. Coolant from the engine may be routed to a heater core located within the passenger cabin to heat the passenger cabin. The engine may be activated in response to a request to heat the passenger cabin even though driver demand torque may be low. However, starting the engine to supply heat to the passenger cabin may reduce vehicle fuel economy. Therefore, it would be desirable to provide a way of heating the passenger cabin that has less effect on vehicle fuel economy.

The inventors herein have recognized the above-mentioned issues and have developed an engine operating method, comprising: deactivating one or more cylinders of an engine via a controller in response to a request to heat a passenger cabin.

By deactivating one or more engine cylinders in response to a request to heat a passenger cabin, it may be possible to provide the technical result of reducing fuel consumption by an engine while increasing passenger cabin heating. In particular, a first group of engine cylinders may remain active while a second group of engine cylinders are deactivated. The active engine cylinders may operate at a higher engine load such that the active engine cylinders exhibit reduced pumping losses and higher efficiency. Further, engine coolant may be supplied to only the first group of cylinders so that less engine coolant is warmed, thereby reducing the mass of coolant being warmed and speeding up heat transfer from the engine to the passenger cabin.

The present description may provide several advantages. For example, the approach may improve vehicle fuel economy during cold ambient conditions. Additionally, the approach may improve passenger cabin heating by reducing the thermal mass in the passenger cabin heating system. Further, the approach may be applied to gasoline, diesel, and alternative fuel engines of hybrid vehicles.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
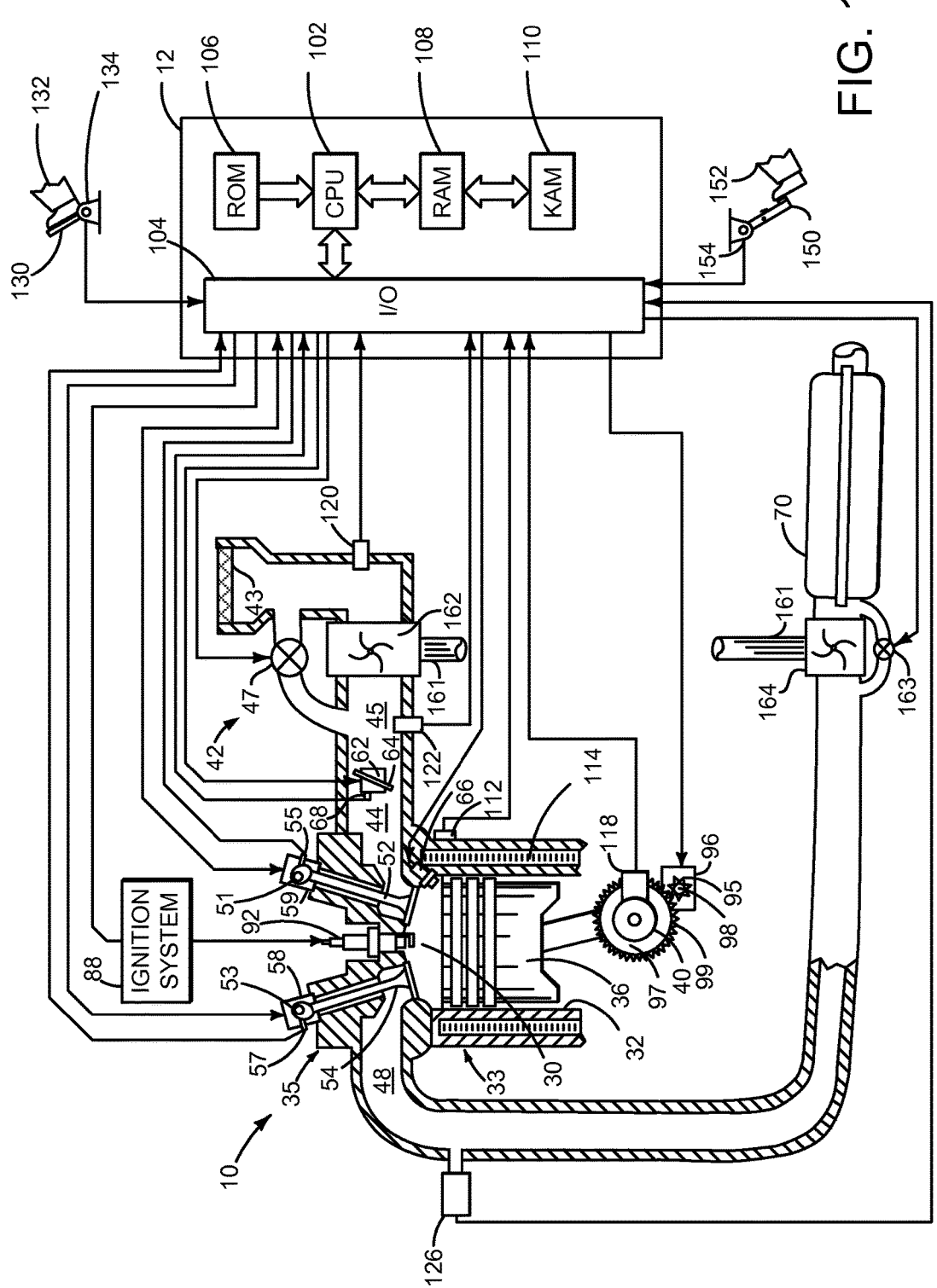
FIG. 1 is a schematic diagram of an engine.
Figure 2:
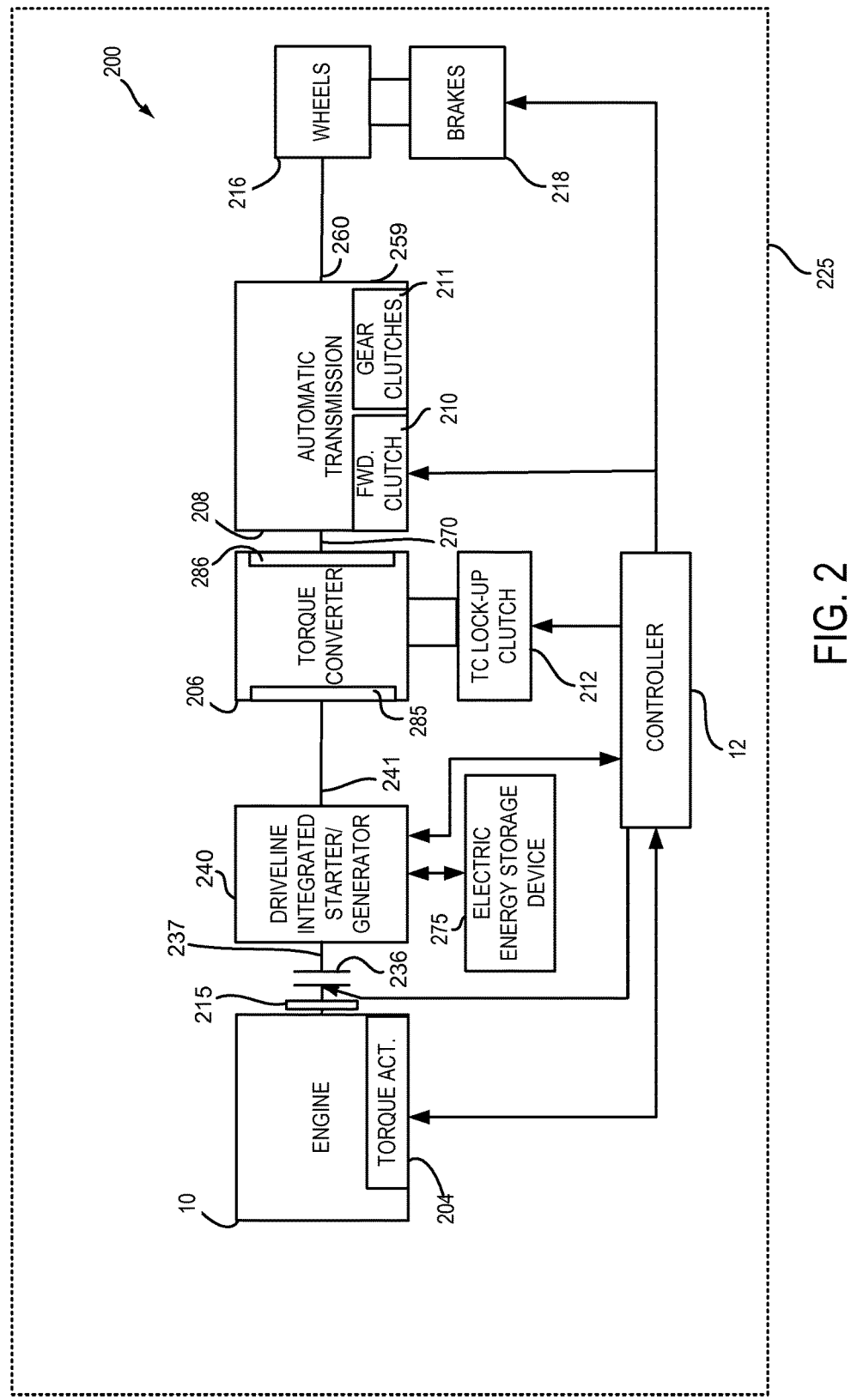
FIG. 2 is a schematic diagram of a hybrid vehicle driveline.
Figure 3A:
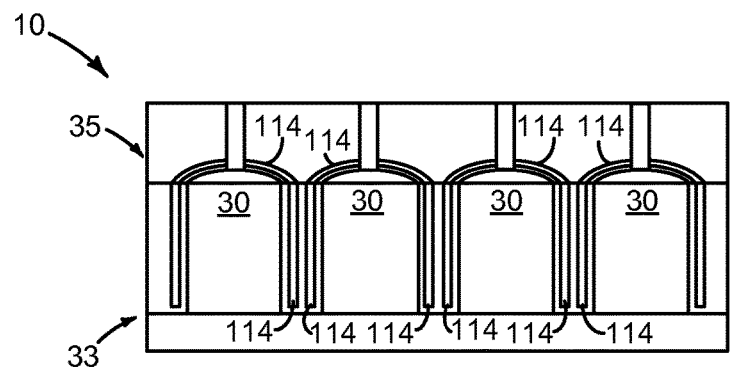
FIGS. 3A and 3B are schematic diagrams of engine coolant flow passages.
Figure 3B:
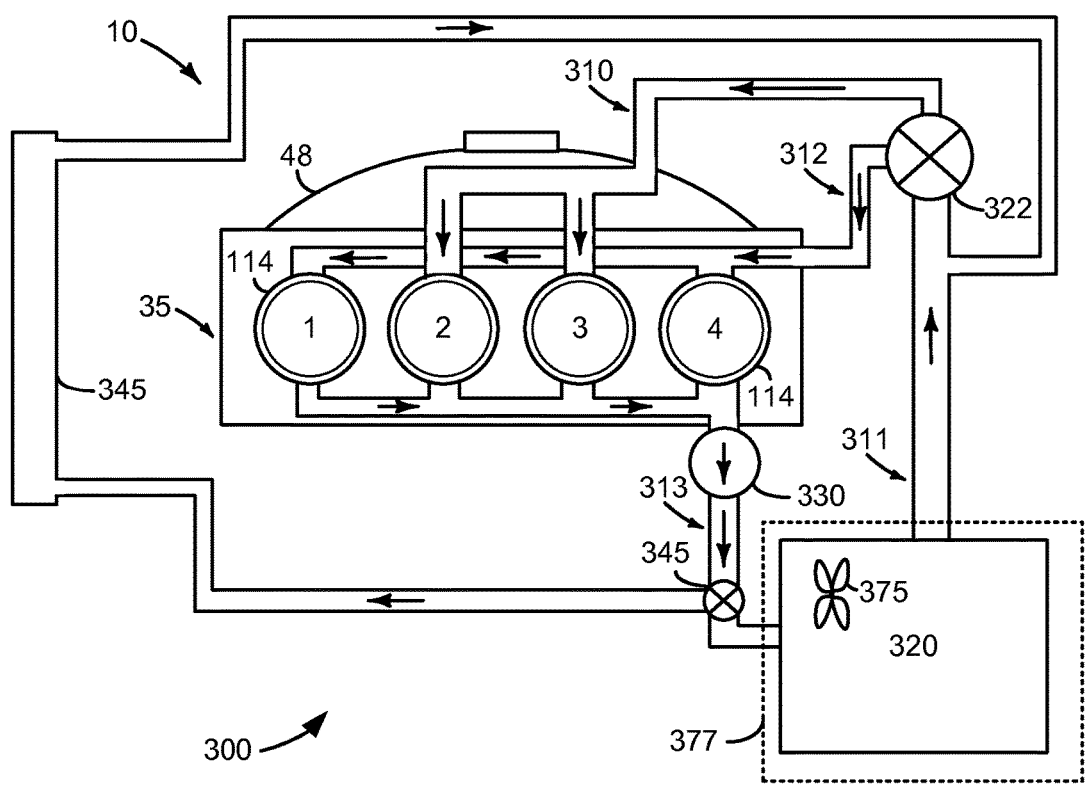

The present description is related to providing heat to a passenger cabin of a hybrid vehicle. The hybrid vehicle may include an engine as is shown in FIG. 1. The engine of FIG. 1 may be included in a powertrain or driveline as is shown in FIG. 2. The engine may include a cooling system as is shown in FIGS. 3A and 3B. The engine may be operated according to the method shown in FIG. 4 to provide the operating sequence shown in FIG. 5.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. In other examples, the starter may be a high voltage electric machine incorporated into the transmission. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures. In other examples, low pressure port fuel injection may be used.

In addition, intake manifold 44 is shown communicating with turbocharger compressor 162 and engine air intake 42. In other examples, compressor 162 may be a supercharger compressor. In yet other examples, no compressor may be used. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a driveline 200. The driveline of FIG. 2 includes engine 10 shown in FIG. 1. Driveline 200 may be powered by engine 10. Engine 10 may be started with an engine starting system shown in FIG. 1 or via driveline integrated starter/generator (DISG) 240. DISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

An engine output torque may be transmitted to an input side of driveline disconnect clutch 236 through dual mass flywheel 215. Disconnect clutch 236 may be electrically or hydraulically actuated. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. In this example, there are no belts, gears, or chains to couple DISG 240 to driveline 200. Rather, DISG 240 rotates at the same rate as driveline 200. In other examples, a high voltage electric machine in the transmission may be coupled to the engine through gears, with or without a torque converter. Electrical energy storage device 275 (e.g., high voltage battery or power source) may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission. In other examples, the torque converter may be omitted.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 may include gear clutches (e.g., gears 1-6) 211 and forward clutch 210. The gear clutches 211 (e.g., 1-10) and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When warm-up conditions are satisfied, controller 12 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate engine 10 by craning engine 10 and resuming cylinder combustion.

The system of FIGS. 1 and 2 provides for a system, comprising: an engine including an engine cooling system, the engine cooling system including a first coolant circuit providing coolant to a first group of cylinders, and a second coolant circuit providing coolant to a second group of cylinders without providing coolant to the first group of cylinders; and a controller including instructions stored in non-transitory memory for selectively allowing coolant flow to only the first group of cylinders, or only to the $2^{nd}$ group of cylinders, in response to a passenger cabin heating request.

In some examples, the system further comprises additional instructions to allow coolant flow to the first group of cylinders and the second group of cylinders. The system further comprises additional instructions to deactivate the second group of cylinders. The system further comprises additional instructions to heat the second group of cylinders after the second group of cylinders have been deactivated. The system includes where the second group of cylinders is heated via coolant supplied to cool the first group of cylinders. The system further comprises one or more valves to direct coolant to only the first group of cylinders and not the second group of cylinders. The system further comprises instructions to activate the engine in response to a request for passenger cabin heat.

The system also provides for a system that selectively operates an internal combustion engine with one or more engine cylinders deactivated and may selectively flow coolant to one or more cylinders to improve passenger cabin heating in response to a request for passenger cabin heat.

Referring now to FIG. 3A, a schematic diagram of a longitudinal cross-section of engine 10 is shown. Combustion chambers 30 are cooled via coolant flowing through cooling sleeves 114. Cooling sleeves 114 allow coolant to flow between block 33 and cylinder head 35. Coolant sleeves of one engine cylinder may be isolated and not in fluidic communication with coolant sleeves of other engine cylinders so that coolant may selectively flow to one or more engine cylinders while coolant does not flow to other engine cylinders.

Referring now to FIG. 3B, a schematic diagram of an example engine coolant system for engine 10 is shown. Coolant system 300 provides cooling to engine 10 and heating to passenger cabin 377. Coolant system 300 may be part of a system including the engine of FIG. 1 and the driveline of FIG. 2. Coolant system 300 is one example engine cooling system where coolant passages are separated to provide cooling to individual cylinder groups. Other similar configurations are anticipated for three and six and eight cylinder engines.

In this example, engine 10 includes four cylinders identified as 1, 2, 3, and 4 having a firing order of 1-3-4-2. Coolant is selectively provided to only cylinders 1 and 4 via coolant circuit or passage 312 and coolant sleeve 114. Coolant is provided to only cylinders 2 and 3 via coolant circuit or passage 310 and coolant sleeve 114. Coolant is pumped via coolant pump 330 to passage 313 where it is directed to passenger cabin heater core 320 and/or radiator 345 via valve 345. In one example, valve 345 is a thermostat. Coolant is directed to valve 322 from heater core 320 and radiator 345. Valve 322 selectively directs coolant to cylinders 1 and 4 via passage 312. Coolant may flow through exhaust manifold 48, cylinder head 35, and block 33. Fan 375 passes air over heater core 320 to warm passenger cabin 377.

Coolant passage 310 supplies coolant solely or only to cylinders 2 and 3 so that cylinders 2 and 3 may provide heat to heater core 320 when cylinders 1 and 4 are deactivated. By cooling only cylinders 2 and 3 when cylinders 1 and 4 are deactivated, the thermal mass of coolant in the cooling system may be effectively reduced so that more thermal energy may be transferred to heater core 320. Further, coolant is supplied to only cylinders 2 and 3 so that the engine may remain operating as an even firing engine (e.g., an equal number of crankshaft degrees between engine combustion events). Alternatively, coolant passage 312 may supply coolant solely or only to cylinders 1 and 4 so that cylinders 1 and 4 may provide heat to heater core 320 when cylinders 2 and 3 are deactivated. By cooling only cylinders 1 and 4 when cylinders 2 and 3 are deactivated, the thermal mass of coolant in the cooling system may be effectively reduced to that more thermal energy may be transferred to heater core 320. Further, coolant is supplied to only cylinders 1 and 4 so that the engine may remain operating as an even firing engine (e.g., an equal number of crankshaft degrees between engine combustion events). Similar coolant passages, cylinder deactivation strategies, and cooling strategies may be applied to two, three, five, six, eight, ten, and twelve cylinder engines, or other configurations.

Figure 4:
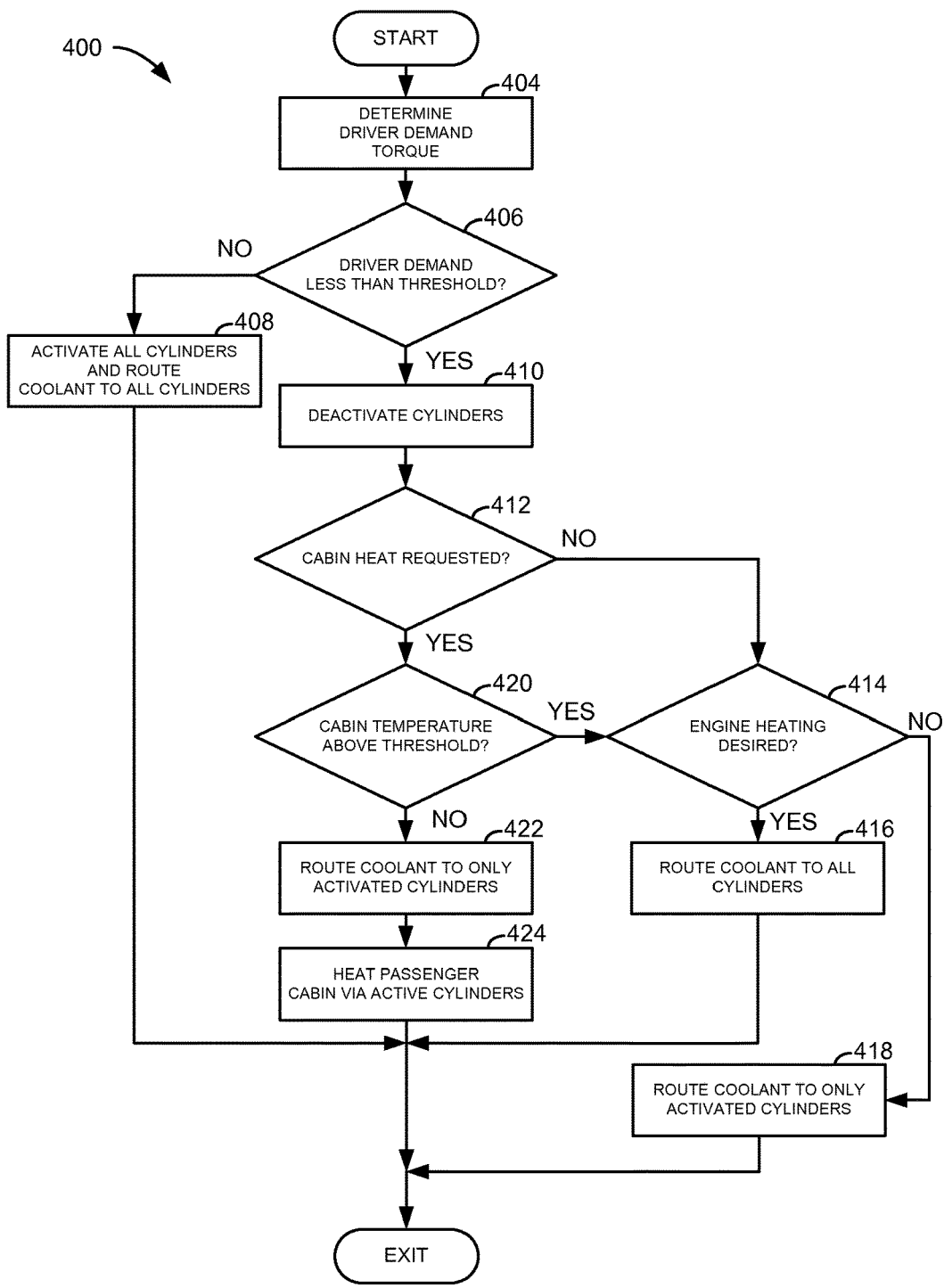
FIG. 4 shows an example method for providing heat to a vehicle's passenger cabin.

Referring now to FIG. 4, a method for operating an engine is shown. The method of FIG. 4 may provide the operating sequence shown in FIG. 5. Additionally, the method of FIG. 4 may be included in the system of FIGS. 1 and 2 as executable instructions stored in non-transitory memory.

At 404, method 400 determines driver demand torque. In one example, driver demand torque is based on a position of an accelerator pedal and engine speed. Driver demand torque increases with increasing application of the accelerator pedal. Method 400 proceeds to 406 after driver demand torque is determined.

At 406, method 400 judges if driver demand torque is less than a threshold torque. The threshold torque is the maximum torque which can be delivered with a group of cylinders deactivated, under the current operating conditions. If so, the answer is yes and method 400 proceeds to 410. Otherwise, the answer is no and method 400 proceeds to 408.

At 408, method 400 activates all engine cylinders, and routes coolant to all cylinders using valve 322. The engine cylinders may be activated by providing fuel to the cylinders and initiating combustion in the cylinders. Combustion may be initiated via spark or via compression. Further, engine cylinders are activated by opening and closing cylinder valves during cylinder cycles. Method 400 proceeds to exit after all engine cylinders have been activated.

At 410, method 400 selectively deactivates a second group of engine cylinders while a first group of cylinders remain active. Fuel is supplied to active cylinders which combust air-fuel mixtures during cycles of the cylinders. Cylinders are deactivated by ceasing fuel flow to the deactivated cylinders and holding valves of deactivated cylinders closed over an engine cycle (e.g., two revolutions for a four stroke engine). Further, for spark ignited engines, spark delivery may be ceased to deactivated cylinders. In one example, the active cylinders are selected such that the engine remains an even firing or combusting engine. In some examples, cylinders may be deactivated by ceasing fuel flow to the deactivated cylinders while maintaining normal operation of valves of the deactivated cylinders. Method 400 proceeds to 412 after selected engine cylinders are deactivated.

At 412, method 400 judges if passenger cabin heat is requested. In one example, passenger cabin heat may be requested via a vehicle passenger activating a passenger cabin heating system. In other examples, passenger cabin heating may be requested automatically via a controller requesting passenger cabin heat when passenger cabin heat is less than a desired passenger cabin temperature. If method 400 judges that passenger cabin heating is requested, the answer is yes and method 400 proceeds to 420. Otherwise, the answer is no and method 400 proceeds to 414.

At 420, method 400 judges if passenger cabin temperature is above a threshold desired passenger cabin temperature. In one example, method 400 compares actual passenger cabin temperature to desired passenger cabin temperature. If method 400 judges that passenger cabin temperature is above the threshold temperature, the answer is yes and method 400 proceeds to 414. Otherwise, the answer is no and method 400 proceeds to 422.

At 422, method 400 routes and pumps engine coolant to only a first of two groups of engine cylinders. In particular, engine coolant is routed to active engine cylinders. Engine coolant is not pumped or routed to deactivated engine cylinders. By routing coolant to only active cylinders, the volume of engine coolant is effectively reduced so that it takes less thermal energy to heat the coolant. In one example, coolant is directed to active engine cylinders via a valve 322. In another example, a separate pump circulates coolant to the active engine cylinders. Method 400 proceeds to 424 after engine coolant is routed to activated engine cylinders.

At 424, method 400 routes coolant from active engine cylinders to a heater core in the passenger cabin without routing the coolant to deactivated cylinders. Air is passed over the heater core and thermal energy is extracted from the coolant to heat the passenger cabin. Method 400 proceeds to exit after passenger cabin heating begins.

At 414, method 400 judges if engine heating is desired. Engine heating may be desired when a temperature of deactivated cylinders is less than a threshold temperature. The temperature of deactivated cylinders may be based on temperature of coolant surrounding deactivated cylinders. If engine heating is desired, the answer is yes and method 400 proceeds to 416. Otherwise, the answer is no and method 400 proceeds to 418.

At 416, method 400 routes or pumps engine coolant to all engine cylinders. In one example, a valve 322 is opened to allow coolant to flow to all engine cylinders. Further, coolant flow may be stopped from flowing to a radiator so that engine heating may increase. Thus, engine coolant is provided to active and deactivated engine cylinders. Method 400 proceeds to exit after coolant flows to engine cylinders.

At 418, method 400 routes or pumps engine coolant only to only a first of two groups of engine cylinders. In particular, engine coolant is routed to active engine cylinders. Engine coolant is not pumped or routed to deactivated engine cylinders. By routing coolant to only active cylinders, the volume of engine coolant is effectively reduced so that it takes less thermal energy to heat the coolant. In this way, engine coolant is heated to prepare for possible future cabin heating demand. In one example, coolant is directed to active engine cylinders via a valve 322. In another example, a separate pump circulates coolant to the active engine cylinders. Method 400 proceeds to exit after engine coolant is routed to activated engine cylinders.

Thus, the method of FIG. 4 provides for an engine operating method, comprising: deactivating one or more cylinders of an engine via a controller in response to a request to heat a passenger cabin. The method includes where the one or more cylinders form a second group of engine cylinders, and where a first group of cylinders of the engine remain active while the one or more cylinders are deactivated. The method includes where the one or more engine cylinders are deactivated in further response to driver demand torque being less than a threshold torque. The method further comprises heating the deactivated one or more cylinders via coolant supplied to cool a group of active cylinders of the engine. The method further comprises heating a passenger cabin of a vehicle via coolant supplied to a group of active cylinders. The method further comprises heating the deactivated cylinders in response to passenger cabin temperature being above a threshold temperature of a desired passenger cabin temperature, or the engine coolant temperature reaching a fully warmed state (i.e. when the coolant in the 1$^{st}$ group reaches a temperature where the thermostat would typically open to send coolant to the radiator, instead send the warm coolant to the cold cylinders).

The method of FIG. 4 also provides for an engine operating method, comprising: routing coolant to a first group of cylinders and not routing coolant to a second group of cylinders via a controller in response to a request to increase passenger cabin heating. The method further comprises deactivating the second group of cylinders in response to the request to increase passenger cabin heating. The method further comprises heating the second group of cylinders in response to passenger cabin temperature being above a threshold desired passenger cabin temperature. The method includes where the second group of cylinders is heated via coolant supplied to cool the first group of cylinders.

In some examples, the method includes where coolant is routed to the first group of cylinders via a first coolant passage and where coolant is routed to the second group of cylinders via a second coolant passage, coolant from the first coolant passage not directly routed to the second coolant passage without returning to a pump. The method further comprises routing the coolant to a heater core in a passenger cabin. The method further comprises routing coolant to the first group of cylinders and the second group of cylinders in response to a driver demand torque exceeding a threshold torque.

Figure 5:
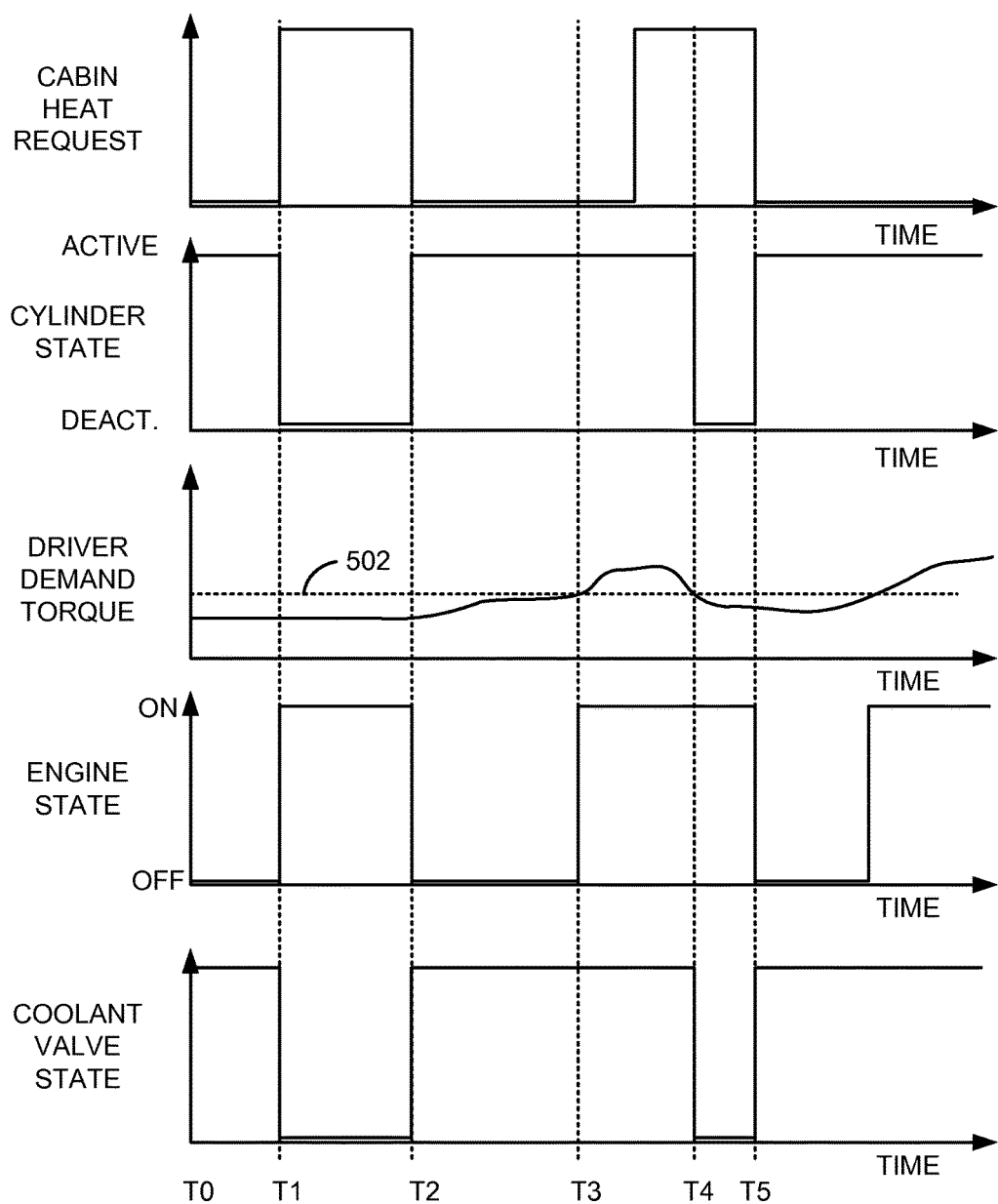
FIG. 5 shows an example simulated engine operating sequence based on the method of FIG. 4.

Referring now to FIG. 5, a sequence for operating an engine according to the method of FIG. 4 is shown. The sequence may be provided via the system of FIG. 1. Vertical lines at time T1-T5 represent times of interest during the sequence.

The first plot from the top of FIG. 5 is a plot of a passenger cabin heating request state versus time. Passenger cabin heating may be requested via a passenger or a controller. The Y axis represents passenger cabin heating request state. Passenger cabin heating is requested when the trace is at a higher level near the Y axis arrow. Passenger cabin heating is not requested when the trace is at a lower level near the X axis. The X axis represents time and time increases from the left side of the figure to the right side of the figure.

The second plot from the top of FIG. 5 is a plot of engine cylinder state versus time. The Y axis represents engine cylinder operating state. A group of engine cylinders are deactivated when the cylinder state trace is at a lower level near the X axis. All engine cylinders are active when the cylinder state trace is near the Y axis arrow. The X axis represents time and time increases from the left side of the figure to the right side of the figure.

The third plot from the top of FIG. 5 is a plot of driver demand torque versus time. The Y axis represents driver demand torque and driver demand torque increases in the direction of the Y axis arrow. The X axis represents time and time increases from the left side of the figure to the right side of the figure. Horizontal line 502 represents a threshold driver demand torque for activating and deactivating engine cylinders. A group of engine cylinders may be deactivated when driver demand torque is less than the threshold level of line 502.

The fourth plot from the top of FIG. 5 is a plot of the engine operating state versus time. The Y axis represents engine operating state. The engine is operating (e.g., combusting air and fuel while rotating) when the engine state trace is near the Y axis arrow. The engine is not operating (e.g., not rotating and combusting air and fuel) when the engine state trace is near the X axis arrow. The X axis represents time and time increases from the left side of the figure to the right side of the figure.

The fifth plot from the top of FIG. 5 is a plot of engine coolant valve state versus time. The Y axis represents engine coolant valve state. Engine coolant is directed to all engine cylinders when the engine coolant valve state is at a higher level near the Y axis arrow. Engine coolant is directed to only active engine cylinders when the engine coolant valve state is at a lower level near the X axis. The X axis represents time and time increases from the left side of the figure to the right side of the figure.

At time T0, passenger cabin heating is not requested and the engine is not activated as indicated by the cabin heating request and the engine state. Driver demand torque is below threshold 502, so the cylinder status indicates that some cylinders are deactivated, but since the engine is stopped (not rotating) this has no practical effect. The engine coolant valve is positioned to allow coolant to flow to all engine cylinders. The vehicle may be propelled via an electric machine during such conditions.

At time T1, passenger cabin heating is requested in response to a passenger request or a controller request (not shown). The engine is activated and started in response to the passenger cabin heating request. The engine is operated with a group of deactivated cylinders and a group of activated cylinders as indicated by the cylinder state trace. The engine coolant valve state is transitioned to a state where coolant is supplied only to active engine cylinders in response to the passenger cabin heating request. Further, the engine is activated even though the driver demand torque is at a lower level. The engine is activated to improve passenger cabin heating.

At time T2, the passenger cabin heat request is no longer requested and therefore the engine is stopped. Driver demand torque is still below threshold 502, so the cylinder status indicates that some cylinders are still deactivated, but since the engine is stopped (not rotating) this has no practical effect. The driver demand torque continues at a lower level and the engine coolant valve is positioned to direct coolant to all engine cylinders in response to the change in passenger cabin heat request.

Between time T2 and time T3, the driver demand increases, but is still below threshold 502 and all other conditions remain unchanged. An electric machine may propel the vehicle and provide the driver demand torque during such conditions.

At time T3, the driver demand torque exceeds level 502 and the engine is started and operated with all cylinders active in response to the driver demand torque. The cabin heat request remains off and the engine coolant valve is adjusted to supply cooling to all engine cylinders.

Between time T3 and time T4, the cabin heat request is asserted in response to a request from a passenger or controller (not shown). All engine cylinders remain active and the engine coolant is supplied to all engine cylinders. The passenger cabin may be provided heat from all engine cylinders during such conditions.

At time T4, the driver demand torque is reduced to less than level 502 and a group of engine cylinders are deactivated while another group of engine cylinders remain active in response to the decrease in driver demand torque. The engine remains active and combusting air and fuel mixtures in the active cylinders. Deactivating a group of engine cylinders may improve engine fuel economy by reducing engine pumping losses. Additionally, the engine coolant valve state is transitioned to a state where coolant is supplied to only active engine cylinders, thereby improving passenger cabin heating and reducing the system's thermal mass.

At time T5, the passenger or controller removes the passenger cabin heat request and the engine is stopped in response to removing the passenger cabin heat request. Driver demand torque is still below threshold 502, so the cylinder status indicates that some cylinders are still deactivated, but since the engine is stopped (not rotating) this has no practical effect. The engine coolant valve also transitions to a state where coolant may be delivered to all engine cylinders.

In this way, cylinders may be deactivated and coolant may be routed to improve cabin heating and reduce engine fuel consumption. Further, although not explicitly shown, heat from activated engine cylinders may be supplied to heat deactivated cylinders. Heating deactivated cylinders may reduce engine emissions when the deactivated engine cylinders are reactivated.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine operating method, comprising:
routing coolant to a first group of cylinders of an engine of a vehicle that are active and not to a second group of cylinders of the engine that are deactivated via a controller in response to both a request to increase passenger cabin heating and a driver demand torque less than a threshold torque; then
removing the request to increase passenger cabin heating while the driver demand torque is still less than the threshold torque; and
stopping the engine and propelling the vehicle via an electric machine responsive to the request to increase passenger cabin heating being removed while the driver demand torque is still less than the threshold torque.

2. The method of claim 1, wherein the engine is an internal combustion engine of the vehicle, and wherein the vehicle is a hybrid vehicle.

3. The method of claim 1, further comprising activating the first group of cylinders, and routing coolant to both the first group of cylinders that are active and the second group of cylinders that are deactivated, and heating the second group of cylinders that are deactivated, in response to a passenger cabin temperature being above a threshold desired passenger cabin temperature and the driver demand torque being less than the threshold torque.

4. The method of claim 3, where the second group of cylinders is heated via coolant supplied to cool the first group of cylinders.

5. The method of claim 1, where coolant is routed to the first group of cylinders via a first coolant passage and where the second group of cylinders is coupled to a second coolant passage.

6. The method of claim 5, further comprising routing the coolant to a heater core in a passenger cabin.

7. The method of claim 1, further comprising activating the first group of cylinders, activating the second group of cylinders, and routing coolant to both the first group of cylinders that are active and the second group of cylinders that are active in response to the driver demand torque exceeding the threshold torque.

8. The method of claim 1, further comprising transitioning a coolant valve to a state for delivering coolant to both the first group of cylinders and the second group of cylinders responsive to stopping the engine.

* * * * *